United States Patent [19]
Calistrat

[11] 4,019,344
[45] Apr. 26, 1977

[54] SYMETRICAL SEALED GEAR COUPLING

[75] Inventor: Michael Mircea Calistrat, Baltimore, Md.

[73] Assignee: Koppers Company, Inc., Pittsburgh, Pa.

[22] Filed: Nov. 24, 1975

[21] Appl. No.: 634,766

[52] U.S. Cl. .................................. 64/9 R; 64/32 F
[51] Int. Cl. ........................................... F16d 3/18
[58] Field of Search .............. 64/9 R, 9 A, 32 R, 14

[56] References Cited

UNITED STATES PATENTS

| | | | |
|---|---|---|---|
| 3,343,376 | 9/1967 | Carman | 64/9 R |
| 3,434,304 | 3/1969 | Meyerhoefer | 64/6 |
| 3,712,080 | 1/1973 | Shigevra | 64/9 R |
| 3,871,191 | 3/1975 | Sugimotto | 64/9 R |

FOREIGN PATENTS OR APPLICATIONS

| | | | |
|---|---|---|---|
| 1,020,838 | 12/1957 | Germany | 64/9 R |

*Primary Examiner*—Samuel Scott
*Assistant Examiner*—Rendall Heald

*Attorney, Agent, or Firm*—Thomas L. Sivak; Oscar B. Brumback

[57] ABSTRACT

A gear type flexible shaft coupling made up of identical halves each including an externally toothed hub surrounded by an internally toothed sleeve in meshing engagement therewith, sleeve connecting flanges with fasteners threaded alternately from opposite sides of the sleeves, an aligning ring extending between the facing sleeves to radially align the sleeves, an axially outer flexible metallic seal ring assembly between the hub and sleeve, a portion of such sealing ring assembly being abuttable against a shoulder on the hub to maintain a substantially uniform lubricant reservoir within the coupling half, an axially inner non-metalic removable sealing cup closing the inner end of the sleeve forming a closed lubricant chamber in each half, such cup including a detent to maintain the cup in position when the coupling halves are disassembled, and elastomeric, axially-spaced sealing rings in the tapered bores of the hubs to facilitate removal of the hubs from the shaft.

5 Claims, 1 Drawing Figure

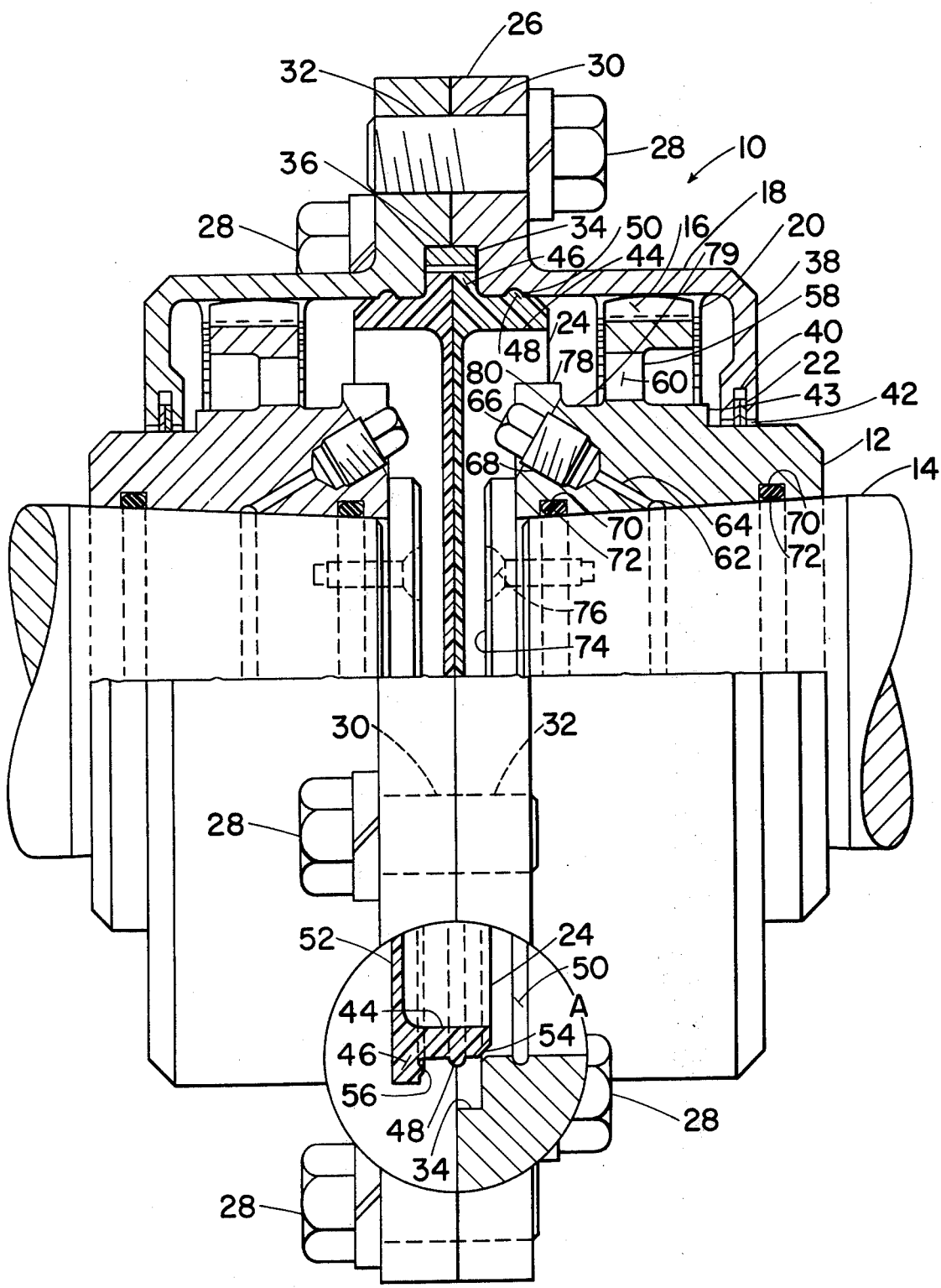

SYMETRICAL SEALED GEAR COUPLING

CROSS REFERENCES TO RELATED APPLICATIONS

This invention relates generally to application Ser. No. 535,876 filed Dec. 23, 1974 and now Pat. No. 3,953,986, issue date May 4, 1976 by Michael M calistrat for "Permanently Sealed Gear Coupling" which is assigned to the assignee of the present invention.

BACKGROUND OF THE INVENTION

1. Field of the Invention

This invention relates generally to flexible shaft couplings having meshing gear teeth and more particularly to a symetrical sealed gear coupling which can be easily disassembled for maintenance of the coupling or equipment connected by the coupling.

2. Description of the Prior Art

Flexible gear type couplings are widely accepted for use in transmitting high torques between substantially aligned driving and driven shafts. Such couplings have been modified in many ways to meet the requirements of particular applications. For example, flexible gear couplings are often used to transmit power from electric motors to gear boxes or other types of drive trains. The operating environment usually dictates the characteristics of the particular coupling to be used such as, the type and frequency of lubrication, the type of shaft mounting, the type of lubricant seals, and the manner of disassembly for maintenance.

One particularly vexing application has developed with respect to couplings suitable for transmitting power in rapid transit vehicles, especially rapid transit trains or individually propelled train cars. Such vehicles require considerable power, are subject to cyclic loading because of frequent starts and stops, and must be reliable since a unit failure can slow down the whole system.

It is especially important that necessary maintenance be easily and quickly accomplished. It should be understood that it is often necessary to repair or replace the electric drive motors or transit vehicles; to do so requires that the motor be quickly and easily disconnected from the drive system. To achieve an overall low maintenance time, the spare parts are usually stocked, including motors and couplings.

More particularly, when a faulty motor is to be repaired or replaced, it is disconnected from the drive train and a new or repaired motor installed in its place to permit the vehicle to be immediately returned to service. To disconnect the motor, it must be disconnected from the coupling connecting it to the drive train. Because of the drive loads involved, the coupling may be connected by a press fit on a tapered shaft of the motor; therefore, it may be necessary to remove the coupling by hydraulic pressure. This is not easily accomplished if a non-separable coupling is used since the motor (or coupling and associated drive train) would have to move axially simultaneously upon disengagement. Therefore, a separable coupling is preferably used so that the motor may be backed away, carrying half of the coupling with it; thereafter, the coupling half may be removed from the motor shaft.

It should also be understood that a motor that is removed may remain in storage pending repair; likewise, once repaired, it may remain in storage until needed. Similarly, a new motor may be readied for use by installing a half-coupling on its output shaft. In addition, several couplings may themselves be stored as spares, either new or conditioned. A new or reconditioned coupling should be packed with grease or oil to prepare it for use; unfortunately, this often cannot be done since the couplings are not provided with seals to retain the lubricant in their separated half-coupling condition; if the halves are stored on end to retain the lubricant, the lubricant usually becomes contaminated by dust or other debris in the storage environment. An example of a separable coupling which does not include seals for each half is shown in U.S. Pat. No. 3,871,191.

Accordingly, an object of this invention generally is to provide a gear type flexible shaft coupling especially suitable for the transmission of power between a driving machine, such as an electric motor, and a driven machine, such as a drive train gearbox. More particularly, an object is to provide, in combination, a gear coupling which is easily separable into individual sealed coupling halves; to provide symetrical coupling halves so that either half may be used as the driving or driven member; to provide a means for radially aligning the coupling halves when they are connected to each other; to provide an easily removable, preferably disposable, inner seal to readily expose the shaft end for removal of the coupling half; to provide a substantially uniformly distributed lubricant reservoir; and to provide simple means for hydraulically removing the coupling halves from their associated shafts.

SUMMARY OF THE INVENTION

The foregoing and other objects are generally achieved by providing a gear type flexible shaft coupling assembled from a pair of identical half-coupling assemblies each including: a hub adapted for connection to a tapered shaft; a sleeve surrounding the hub, such sleeve having a ring of internal gear teeth in operative engagement with a ring of external teeth on the hub; a single aligning ring seated in facing recesses in the sleeves to radially align the sleeves; a flexible metallic seal ring seated in the axially outer end of the sleeve surrounding an end portion of the hub in sealing engagement therewith; and a removable sealing cup seated within the axially inner end of the sleeve to close the end of the half-coupling assembly to retain lubricant therein.

In the preferred construction, the coupling hubs also include axially-spaced, non-metallic sealing rings in their tapered bores and an annular recess between the sealing rings connected by an oil passage to the inner end of the coupling hub for the application of hydraulic pressure between the mating surfaces of the shafts and hub bores for removal of the hubs.

To make the sleeves identical, the connecting flanges are preferably provided with alternating clearance and tapped holes so that threaded bolts may be threaded in the tapped holes alternately from opposite sides of the flanges. In this manner, threaded nuts on the bolts are not needed.

The hubs preferably include an annular shoulder adjacent to and axially inwardly from the metallic seal rings against which the seal ring seating portion abuts to limit axial movement of the sleeve.

The above and other novel features of the invention will appear more fully in the following detailed description when read in connection with the accompanying drawing. It is to be understood, however, that the drawing is not intended as a definition of the invention but is for the purpose of illustration only.

BRIEF DESCRIPTION OF THE DRAWING

The drawing illustrates, in side elevation, the coupling of the present invention mounted on a pair of axially-spaced, substantially aligned, shafts with the upper half of the drawing showing the coupling in cross-section and the lower half showing it in full view. The insert "A" shows the configuration of the sealing cup just prior to assembly in the sleeve.

DESCRIPTION OF THE PREFERRED EMBODIMENT

The drawing illustrates the preferred embodiment of the present invention. Since each half of the coupling is identical to the other, only the parts on the righthand side are numbered for clarity, corresponding parts on the left being readily identifiable. An end view is not shown since those skilled in the art will recognize that the coupling is essentially annular.

The coupling assembly, generally denoted by numeral 10, essentially includes a pair of hubs 12 adapted for connected to respective ones of shafts 14, a pair of axially-connected sleeves 18 surrounding the hubs in driving engagement therewith, an alignment ring 36 seated within facing recesses 34 in the sleeves for radially aligning the sleeves upon assembly of the coupling halves, axially outer flexible metallic sealing rings 22 held in the sleeves in flexible sealing engagement with the hubs, and axially inner removable sealing cups 24 held in the sleeves for closing the inner ends of each half-coupling to retain lubricant between them and the outer metallic rings. The hubs 12 preferably include tapered bores for an interference fit with corresponding tapers on their associated mounting shafts 14. An annular recess 62 in the hub bores is connected by an oil passage 64 to an inner end of the hubs for the application of pressurized hydraulic fluid between the hubs and shafts to remove the hubs; axially-spaced resilient seal rings 72 in the hub bores contain the hydraulic fluid so that full hydraulic pressure can be used to break the connection.

More specifically, the hubs 12 include a ring of external gear teeth 16 formed in an annular web portion 58 formed on the hub 18. A plurality of circumferentially spaced holes 60 pass axially through the web portions 58 to permit lubricant in the coupling half between the flexible metal seal rings 22 and the seal cups 24 to pass from one side of the web portion 58 to the other to assure a uniform distribution of lubricant within the coupling half.

The sleeves 18 include rings of internal gear teeth 20 formed around the inner periphery of the sleeve for operative engagement with the external teeth 16 on hubs 12. Thus, it can be seen that rotation of one shaft 14 and its associated hub 12 will cause rotation of the other hub and shaft through the connected sleeves 18.

The sleeves 18 include annular axially facing flanges 26 through which the sleeves 18 are connected. Each flange 26 includes a plurality of circumferentially spaced clearance holes 30 and a plurality of threaded holes 32 spaced therebetween. Conventional fasteners 28 pass through the clearance holes 30 and are screwed into the tapped holes 32. Since the clearance holes and tapped holes alternate circumferentially, it can be seen that the fasteners 28 are threaded alternately through the flanges 26 from opposite sides thereof. Thus, both sleeves can be identical and it is not necessary to provide threaded nuts on the ends of the fasteners 28.

The sleeves 18 also include annular axially facing recesses 34 in which an aligning ring 36 extends axially between the two sleeves. The aligning ring serves to radially align the sleeves 18 upon assembly without the need for corresponding male and female portions to achieve alignment which would require the sleeves to be different.

The flexible metal seals 22 are preferably metal seal rings of the type having at least two circumferentially overlapping coils as shown in the drawing. Seal ring 22 is held in radial compression against the hub and flexes radially to compensate for misalignment of the hubs 12 with respect to the sleeves 18 in the well known manner such as shown in U.S. Pat. No. 3,343,376. The seal rings 22 may be of the type known as "Spirolox" rings made by the Ramsey Corporation, St. Louis, Mo.

Seal rings 22 are contained in an annular recess or groove 40 formed in a radially inwardly extending flange portion 38 on the outer end of the sleeve 18. The groove 40 is made larger than the outer diameter of ring 22 and the inner diameter 42 of flange 38 is made larger than the outer end of hub 12, creating a space between the hub and the flange, to permit the ring 22 to expand radially and to provide clearance between the hub and the flange to accommodate angular misalignment of the shaft 41.

The lubricant used within the coupling is preferably grease rather than oil although oil may be used. Since the lubricant tends to centrifuge, it is important that a space be provided for it on either side of the rings of gear teeth 16 and 20; otherwise, lubricant might not lubricate the teeth completely across their faces. Thus, it can be seen that the spaces on either side of the gear teeth should be maintained to achieve an even distribution of lubricant. To accomplish this, an annular raised shoulder 43 portion is provided on the hub to limit axial movement of the sleeve 18; that is, as the sleeve moves axially, the flange portion 38 of sleeve 18 will abut the shoulder 43 to prevent further axial movement of the sleeve. In this manner, a substantially even distribution of the lubricant is maintained.

The seal cups 24 include axially extending tubular flange portion 44, seated within the inner periphery of the sleeves 18, and a disc-shaped body portion 52 for completely enclosing the inner ends of the coupling halves. The cups 24 also include radially extending annular flange portions 46 seated within the sleeve recesses 34 so as to be squeezed therebetween when the sleeves 18 are connected by the fasteners 28; the outer perimeters of the cup flanges 46 lie within the inner perimeter of the aligning ring 34 as shown. The sleeve 18 are provided with annular recesses 50 into which a corresponding annular detent portion 48 of cups 24 extends when assembled within the sleeves 18. The detents 48, when seated in the annular recesses 50, serve to hold the cups in position even when the coupling halves are separated. Thus, the lubricant within the coupling halves is retained at all times. However, since lubricant may tend to leak past the detent from centrifugal force during operation, the flange 46 is also provided with an annular lip portion 56, as best illustrated in the inlet "A", which is squeezed flat under pressure when the sleeves 18 are connected together. This arrangement provides a positive seal for the lubricant within the coupling halves.

The cups 24 are preferably made from a synthetic rubber or plastic material with the detent 48 and the sealing lip portion 56 formed therein by molding or machining. Thus, the sealing lip portion 56 can be depressed or deformed upon assembly to provide tight contact with the recesses 34 in the sleeve 18. The inset "A" shows the profile of the seal cup 24 in cross section just prior to its assembly into the sleeve 18 on the right hand side of the drawing. As the cup 24 is moved to the right, the annular detent 48 will be readily compressed until it reaches the recess 50 at which time it will snap into place. A chamfer 54 eases insertion of flange 44 into sleeve 18. When the sleeves 18 are fastened together, the seal lip portions 56 will be squeezed into the flanges 46 of the cups as shown in the upper portion of the drawing.

An additional advantage of using plastic seal cups 24 is that they are easily and cheaply molded so that, if necessary, they may be discarded after removal when removing the coupling halves from the shafts 14 as will be subsequently explained. A screw driver may be used to easily pry the cups out of the sleeves.

To meet the high torque loads required and still keep the coupling as small as possible, it is desirable to fit the hubs 12 onto the shafts 14 as shown in the drawing; that is, by using a press or interference fit between the hubs and shafts, it is not necessary to provide keyways in the parts which, of necessity, would require the hubs 12 to be larger. To achieve a tight connection between the hubs 12 and shafts 14, the hubs 12 are preferably pressed on the shafts by hydraulic pressure as well understood by those skilled in the art. However, this connection is so tight that hydraulic pressure is needed to remove the hubs 12 from the shafts 14. This is accomplished by placing resilient, preferably elastomeric, seal rings 72 in annular recesses 70 formed in the hubs 12 with an axial space between them. Another annular recess 62 is formed in the hub 12 between the seal rings 72 to receive hydraulic pressure through an oil passage 64 connecting the recess 62 with the inner end portion of the hub 12. The passage 64 is provided with a larger threaded opening 68 in which a threaded plug 68 secured to prevent lubricant from entering the recess 62 during operation of the coupling. When the hub is to be removed from the shaft, the plug 66 is removed and replaced by a hydraulic fitting (not shown) to supply hydraulic fluid under pressure to the recess 62. The hydraulic fluid is forced from the recess 62 between the hub 12 and shaft 14 thereby breaking the connection between the hub and the shaft. The seal rings 72 contain the hydraulic fluid so that it acts to expand the coupling hub a slight amount and causes it to move toward the end of the shaft 14. The hub 12 is retained, during operation, on the shaft 14 by a washer 74 secured to the end of the shaft by a plurality of circumferentially spaced screws 76. When the hub 12 is to be removed, the screws 76 are loosened a slight amount to permit the washer 74 to be spaced from the inner end of the hub 12. Thus, as the hub is moved toward the washer by hydraulic pressure, it will not come off the shaft.

The hub 12 also preferably includes an annular raised shoulder portion 78 on the inner end thereof forming an annular groove 79 in the hub 12 between the shoulder portion 78 and the web portion 58. This construction is preferred in the event that hydraulic pressure is not available for removing the hub 12 from the shaft 14. Thus, a conventional wheel puller or similar apparatus may be clamped around the raised shoulder portion 78 and against the end of the shaft 14 to forceably remove the hub 12 from the shaft 14. A flat surface 80 is cut in the shoulder portion 78 at the angle shown to accommodate the plug 66.

To operate the coupling, the sleeves 18, including seal rings 22, are placed around the hubs 12 and, thus assembled, the hub on one half is placed around the tapered end of a shaft 14. Hydraulic pressure is used in the known manner to force the hub in tight engagement with the shaft. Washer 74 is then secured against the end of shaft 14 and against the end of hub 12 by screws 76. With the plug 66 in place, the coupling half is packed with grease and the sealing cup 24 pressed in place. The other hub and sleeve assembly is similarly mounted to the other shaft. The alignment ring 36 is inserted in one of the recesses 34 and, with the shafts 14 moved together as shown, the other sleeve 18 is drawn over the alignment ring and both sleeves connected by the fasteners 28 as previously described. The coupling 10 is then ready for operation.

Substantially the reverse procedure is used to disassemble the coupling except that hydraulic pressure is usually needed to break the connection between the hubs and shafts. This is accomplished as previously described.

Thus, the preferred construction of the invention combines the essential features necessary to achieve a relatively small, but extremely rugged and reliable coupling that requires little maintenance and is easily removed and installed to permit rapid replacement or service of associated parts. The coupling halves, being identical mirror images of each other, makes interchangeability practical; the connecting flange construction of the sleeves, including the aligning ring, simplifies installation and removal of the coupling halves; the metallic seal rings are durable and seldom need replacing; the seal cups are easily removable, and disposable if desired, to permit ready access to the hubs for removal; in addition, the cups are self-locking in position and provide a positive seal against escape of lubricant from each coupling half; the shoulder portions on the hubs serve to limit axial movement of the sleeve to maintain a lubricant reservoir on both sides of the gear teeth thus assuring a substantially uniform distribution of lubricant, particularly with the holes in the web portion supporting the external teeth which permits lubricant to pass from one side of the teeth to the other; and the axially-spaced seals in the tapered bores of the hubs contain the hydraulic fluid introduced through the passages to between the hubs and shafts to simplify removal of the hubs from the shafts.

Accordingly, the invention having been described in its best embodiment and mode of operation, that which is desired to be claimed by Letters Patent is:

1. A gear type flexible coupling for connecting a pair of substantially axially aligned shafts comprising in combination:

substantially identical first and second hub means, adapted for connection to respective ones of said shafts, having a ring of external gear teeth thereon;

substantially identical, axially-connected, first and second sleeve means surrounding said hub means and having a ring of internal gear teeth therein in operative engagement with said external gear teeth;

aligning ring means seated within facing annular recesses in said sleeve means and extending axially therebetween for radially aligning said sleeve means;

substantially identical first and second flexible sealing ring means, seated in outer end portions of said sleeve means, surrounding outer end portions of said hub means and in sealing engagement therewith; and substantially identical first and second removable sealing cup means seated within the inner periphery of said sleeve means of closing inner end portions of said sleeve means to retain lubricant within each of said sleeve means between said cups and said flexible sealing ring means each said seal cup means having annular detent means around a tubular flange portion thereof and each said sleeve means having a corresponding annular recess in the interior thereof for seating and removably retaining said cup means therein during separation of said sleeve means with one of said hub means therein.

2. The coupling of claim 1 wherein said seal cup means are non-metallic.

3. The coupling of claim 1 wherein said seal cup means include a radially extending annular flange portion, seated within said facing annular recesses, having an annular, axially-extending lip portion thereon deformable by said sleeve means for sealing engagement between said sealing cup means and said sleeve means.

4. The coupling of claim 1 wherein said hub means' include tapered bores, for interference mounting on corresponding tapered portions of said shafts, and axially-spaced non-metallic sealing rings in said bores between annular oil recess is formed and further including an oil passage between said annular oil recess and an inner end portion of said hubs for the introduction of hydraulic fluid under pressure between said tapered bores and said shafts to disengage said hubs from said shafts.

5. A gear type flexible coupling for connecting a pair of substantially axially-aligned shafts comprising in combination:

first and second identical hub means each having:
an annular, radially-extending, web portion having a ring of external gear teeth formed thereon and a plurality of axial openings therein for the passage of lubricant therethrough;
an annular raised shoulder portion spaced between said web portion and an outer ene portion of said hub means; and
a tapered bore for interference mounting of said hub means on a corresponding tapered portion of an associated one of said shafts, said tapered bore including axially-spaced elastomeric sealing rings seated in corresponding annular grooves in said tapered bore and an annular oil groove spaced between said grooves, said oil groove being connected to an inner end portion of said hub by an oil passage for the introduction of hydraulic fluid under pressure between the portions of the hub and shaft extending between said elastomeric sealing rings to disengage said hub from said shaft;

first and second axially-connected identical sleeve means surrounding said first and second hub means', each sleeve means having:
a ring of internal gear teeth in operative engagement with an associated ring of said external gear teeth on said hub means;
a radially extending connection flange facing a corresponding flange on the other of said sleeve means, said connecting flange including a plurality of circumferentially spaced openings axially aligned with corresponding openings in the other of said sleeve means for receiving threaded fasteners in alternate ones of said openings passing through said corresponding openings;
an annular recess in said connection flange, adjacent an inner periphery of said sleeve means, facing a corresponding recess in the other of said sleeve means; and
a radially inwardly extending outer end portion, having an inner annular groove therein, spaced from a portion of said hub means extending between said raised shoulder portion and an outer end portion of said hub means, said outer end portion being abuttable against said raised shoulder portion to limit axial movement of said sleeve means;

an aligning ring means in said facing annular recesses in said connection flanges and extending axially therebetween for radially aligning said sleeve means;

a flexible metal sealing ring means in each of said inner annular grooves in said inwardly extending end portions of said sleeve means surrounding said portions of said hub means adjacent said raised shoulder and in sealing engagement therewith; and a removable, non-metallic sealing cup means seated within the inner ends of each of said sleeve means for retaining lubricant between said cup means and said flexible metal sealing ring means, said sealing cup means each having a disc-shaped body portion extending into said annular recess in said connection flange, and deformable into sealing engagement therewith, and each having a tubular flange portion extending axially outward into said sleeve means, said tubular flange portion including an annular detent means seated in a corresponding annular groove in said sleeve means for retaining said sealing cup means during separation of said sleeve means with one of said hub means therein.

* * * * *